United States Patent [19]
Metherell

[11] 3,863,197
[45] Jan. 28, 1975

[54] HOLOGRAM HAVING EQUAL INTENSITY FOR SPACED APART OBJECTS

[75] Inventor: Alexander F. Metherell, Newport Beach, Calif.

[73] Assignee: Actron Industries, Inc., Monrovia, Calif.

[22] Filed: Dec. 11, 1972

[21] Appl. No.: 314,198

[52] U.S. Cl. ............... 340/1 R, 73/67.5 H, 350/3.5, 340/5 H, 343/17
[51] Int. Cl. ............................................. G01s 9/66
[58] Field of Search ........... 340/1 R, 3 R, 3 A, 3 D, 340/5 R, 5 H, 5 MP; 343/5 GC, 5 R, 17; 356/4, 5; 350/3, 5; 73/67.5 H, 67.7, 67.8 R

[56] References Cited
UNITED STATES PATENTS 3,017,832 1/1962 MacDonald.................... 340/3 R X
3,201,707 8/1965 Aucremanne et al. ......... 340/3 A X

*Primary Examiner*—Richard A. Farley
*Attorney, Agent, or Firm*—Marvin H. Kleinberg

[57] ABSTRACT

A hologram is generated by recording the wave energy reflected from a plurality of spatially separated objects. The objects are illuminated by a coherent continuous wave radiant source that is time modulated according to a predetermined attenuation pattern from a maximum value to a minimum value. The output of a receiver is recorded at a time corresponding to the receipt of the "echo" from the most distant object. Distant objects are illuminated by earlier, greater amplitude radiation and the nearest object is illuminated by a later, lesser amplitude radiation. All received echoes at the receiver have substantially the same intensity at the time of recording.

4 Claims, 3 Drawing Figures

Patented Jan. 28, 1975 3,863,197
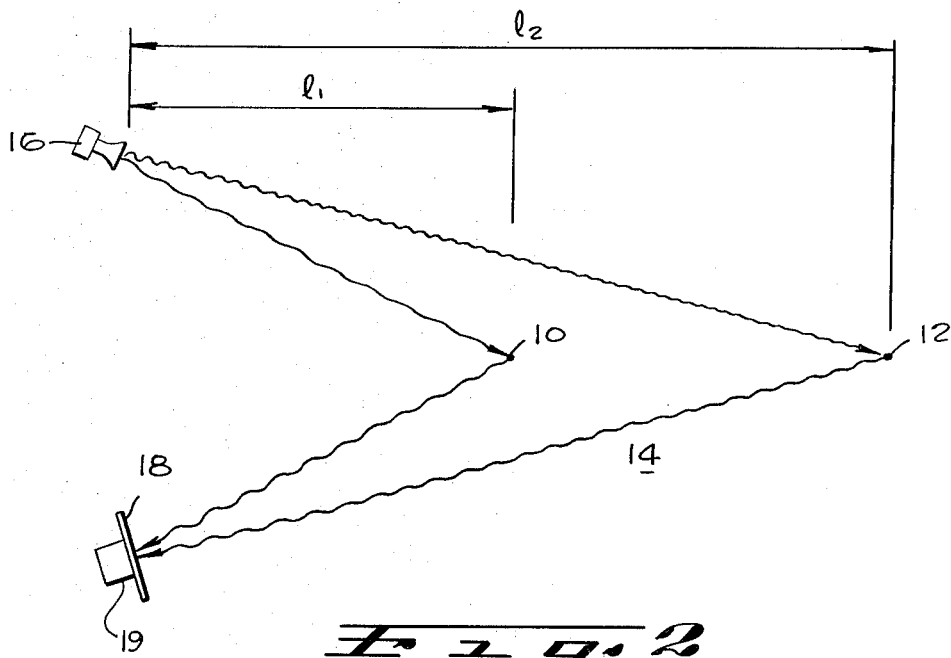
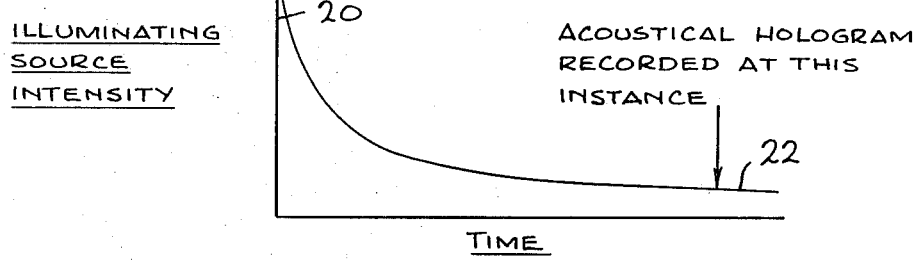
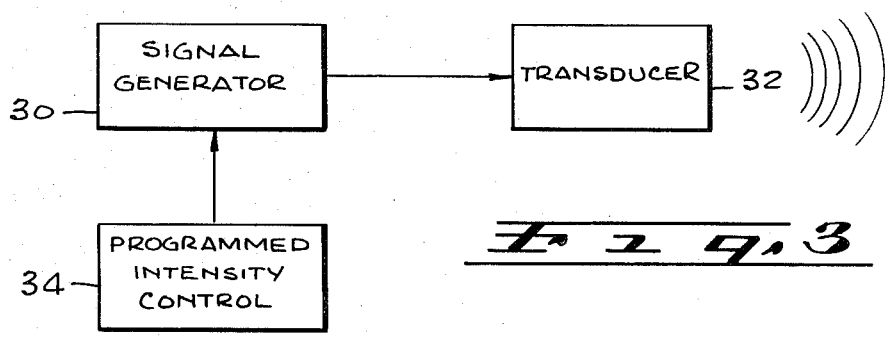

HOLOGRAM HAVING EQUAL INTENSITY FOR SPACED APART OBJECTS

This invention relates to an apparatus and method for the intensity of the time varying continuous wave radiant energy used to illuminate a plurality of spatially separated located objects and more particularly to an improved technique for producing reflections of equal intensity from the plurality of spatially separated objects.

Prior art techniques for creating holograms are well known. While lasers or other coherent sources of radiant energy are commonly associated with the creation of holograms and the reconstruction of images therefrom, coherent acoustical radiation has also been employed to create acoustical holograms.

Certain advantages of acoustical holography have been described by the inventor in the Scientific American Volume 221, Pages 36–44, in the October 1969 issue.

Acoustical holograms have many advantages over optical holograms especially if an object is not easily illuminated by visible light. For example, sound can easily travel a considerable distance through dense homogenous matter such as liquids or solids which are opaque to light. It was appreciated that sound is particularly superior to X-rays in medical diagnosis because of the radiation hazard present. Sound may also be preferred in non-destructive testing where it is desired to look beneath the surface to determine discontinuities and for visualizing submerged objects or subterranean strata.

The present invention is particularly adaptable to the internal examination of the human body in the general field of diagnostic investigation. The apparatus normally consists of a coherent acoustical sound source which is radiated into the environment containing the objects to be detected. Reflections of the sound energy from spatially separated objects are received and recorded. However, it was soon realized that objects located close to the radiating source or to the receiver source would produce reflected echoes of a greater magnitude than reflected echoes from the more distant objects. As a result of the variations in intensities of the various received echoes, it became difficult to evaluate the received images.

The use of high power energy at the source resulted in very strong or "bright" echoes from the close-by objects which could mask out any echoes from more distant objects. However, the use of a low power energy source resulted in such weak signals being received from distant objects that the information became meaningless as a diagnostic tool.

This problem, is of course, similar to problems found in seismic exploration or in CW, long range radar. An initial pulse of energy is transmitted and, to accommodate the attenuation of the energy with travel, the receiver gain is increased according to a predetermined relationship with time, to provide returned echoes of substantially constant intensity.

The present invention is concerned with a device and technique for producing substantially equal intensity return signals which are capable of being recorded as an acoustical hologram from objects that are spatially separated with respect to the transmitting and recording means.

In the preferred embodiment, a radiation source illuminates a plurality of distant, spaced apart objects with a coherent continuous wave over a substantially long period of time. The coherent wave is preferably an acoustical wave since an acoustical wave is preferred for recording diagnostic information, although these principles are equally applicable to radiant energy of any type such as electromagnetic waves as used in radar and of any wave length. The period of time of illumination is continuous and determined substantially by the time it takes a reflected echo to arrive from the most distant object under observation.

The coherent continuous wave is time modulated from an initial maximum value to a final minimum value according to a given function which could approximate an exponential function. The initial maximum value of the signal is determined by the distance of the farthest object from the source and attenuation of the medium through which the object is being illuminated. The minimum value is determined by the sensitivity of the recording apparatus. The optimum time for recording the hologram is also based upon the distance of the remotest object from the source and the attenuation of the medium. Generally these values can be determined empirically. In most cases the medium will be the same. However, it is possible that different layers of materials of different density through which the beam must propagate, would have different attenuating factors.

The reflected waves from the plurality of objects are received and recorded substantialy simultaneously at a time determined by the distance of the farthest of said objects. It will be apparent, therefore, that at the time of recording the reflected waves, the most distant object will have been illuminated by the maximum or "brightest" initial illuminating signal. The less remote objects at the time of recording the reflected waves will have been illuminated by lesser magnitude illuminating signals. The recorded echoes then should have a "brightness" or intensity substantially independent of the distance of the objects. If the medium is substantially homogenous, all objects will appear equally bright no matter when the image is recorded. If the record is made before the echo returns from the most remote object, the less remote objects will be recorded at a higher brightness level while the most remote object will not be seen.

Further objects and advantages of the present invention will be made more apparent by referring now to the accompanying drawings wherein:

FIG. 1 illustrates the arrangement of elements to produce an acoustical hologram;

FIG. 2 graphically illustrates the time varying illumination technique, according to the present invention; and FIG. 3 illustrates a preferred signal generating means for creating a controllable exponential time varied output signal.

Referring now to FIG. 1 there are shown first and second spaced apart objects, 10, 12, located within a medium 14. A sound generating source 16 capable of generating a pure coherent tone of sound is used to illuminate the area under investigation. In the situation where the objects 10, 12 are located within the confines of the human body, the sound source 16 will be varied until reflections from these spaced apart objects 10, 12 cause reflected waves to be impinged on a suitable detector 18 combined with a recording medium 19.

As noted above, in conventional pulse echo imaging techniques, a time varying gain on the receiver is used to compensate for the high attentuation in the medium. The conventional recording is made of echoes over a substantially long period of time wherein the time of return determines the distance of the object from the source. The illuminating source is characterized as a high pulse of energy which is generated over a substantially short period of time. As time increases, the echoes from the more distant object are attenuated as a result of the propagation of the energy through the medium. This is normally compensated for in the pulse echo devices by using a time varying gain circuit in the receiver, which increases amplifier gain by some function that is usually exponential with respect to time.

The prior art techniques just described can not be readily applied to the problems in the acoustical holography situation where the recording is not made over a long period of time, since the acoustical hologram is recorded at a specific instant of time. According to the present invention, the hologram is recorded preferably at a time when the echo from the most distant object has been received.

Referring now to FIG. 2 there is shown a curve illustrating how the transmitted signal from the sound source 16 is varied from a maximum 20 to the origin at a minimum 22 at a later time. It will be recognized that the illuminating signal, as indicated in FIG. 2, is on for the full length of time that echoes are being detected from both the near object 10 and the most distant object 12. This of course should be contrasted with present day pulse echo technique where the illuminating signal is a short term pulse of high energy.

The hologram record is made when the reflections from the most distant object 12 are detected at the recording medium 19 or after which time a permanent record can be initiated. A review of FIGS. 1 and 2 will show that the most distant object 12 is initially illuminated by the maximum amplitude of the illuminating signal 20. By the time that the echo returns from the distant object 12, the illuminating signal has diminished in amplitude and the returned echo of the nearer object 10 has approximately the same intensity or "brightness" as the reflected echo of the distant object 12. If the medium is homogenous, all objects in the illuminated area will provide echoes at the recording medium 19 which at any given time, will be substantially equal in "brightness" or intensity.

Referring now to FIG. 3 there is shown a preferred block diagram for generating a time varying output signal from the illuminating transducer. A signal generator 30 is coupled to an output transducer 32. The transducer 32 generates an output radiant energy signal for illuminating the objects under investigation.

The output signal will be a decaying signal that decays at a predetermined rate with time.

In the preferred embodiment a programmed intensity control unit 34 will be located on the signal generator 30, in order to allow the investigator to change the amplitude of the outgoing signal and the rate of decay which will thereby provide a measure of control for obtaining equal intensities from objects that are at unknown, different distances from each other and from the transducer 32 or the detector. The programmed intensity control unit 34 determines the initial as well as the final amplitude of the outgoing signal as well as the rate of change as illustrated in FIG. 2. The control unit 34 provides the investigator with means for obtaining constant intensities from spatially located objects if the attenuation of the medium is not the same between the illuminating source and the objects under investigation.

It is clear that means are well known in the art to program the radiant energy source with respect to time. It will also be clear that, after the initiation of illumination, the amount of time that elapses will depend only upon the sensitivity of the receiver. If the program has been properly chosen, the illumination received from a near object will always be at approximately the same magnitude as the illumination returned from a more remote object.

While the image of remotest object will be brightest upon the receipt of the first echo, a later record may have an acceptable level of brightness and may be less "noisy" for better identification of objects. Accordingly, the principles of the present invention are equally applicable to other systems in which remote objects must be illuminated and the returned energy detected and/or recorded.

Therefore the breadth of the invention must be limited only by the scope of the claims appended below.

What is claimed as new is:

1. A system for providing at a predetermined time equal intensity reflections from a plurality of spatially separated objects comprising:
    a radiation source having an output for illuminating a plurality of spaced apart objects with coherent continuous wave radiation;
    control means for time varying the output amplitude of said radiation source from an initial value to a final value, said initial value being determined by the distance of the farthest object from said source, and the rate of change of amplitude being determined by the distance of the nearest object from said source.

2. A system according to claim 1 in which said radiation source generates an acoustic coherent continuous wave, and said control means operate as a function of the attenuation of the acoustic wave in the medium.

3. A system according to claim 1 in which said control means operate to vary the amplitude of said radiation source at an exponential rate.

4. A method of making acoustical holograms comprising the steps of:
    a. initiating an illuminating energy beam at a first magnitude of intensity for illuminating spatially separated objects in a medium; and
    b. decreasing the intensity of the energy beam with time according to a program dependent upon attentuation of energy in the medium and the relative distance of the remotest object whereby illuminating energy returned from the remotest object has a magnitude approximately equal to that of the illuminating energy returned from a less remote object.

* * * * *